United States Patent [19]

Marks

[11] Patent Number: 5,531,617
[45] Date of Patent: Jul. 2, 1996

[54] NEUTRAL LUG ASSEMBLY FOR A PANELBOARD

[75] Inventor: Robert J. Marks, Rockvale, Tenn.

[73] Assignee: Square D Company, Palatine, Ill.

[21] Appl. No.: 253,540

[22] Filed: Jun. 3, 1994

[51] Int. Cl.$^6$ .................................................. H01R 11/09
[52] U.S. Cl. ............................................ 439/723; 439/798
[58] Field of Search ................................... 439/709–715, 439/720–723, 798, 810, 814, 907

[56] References Cited

U.S. PATENT DOCUMENTS

| | | | |
|---|---|---|---|
| 2,748,365 | 5/1956 | Speck | 439/798 X |
| 3,516,049 | 6/1970 | Goodridge | 439/798 |
| 3,594,710 | 7/1971 | Stanback | 439/798 X |
| 3,693,137 | 9/1972 | Brumfield | 439/798 X |
| 5,322,458 | 6/1994 | Hennemann et al. | 439/723 |

*Primary Examiner*—Khiem Nguyen
*Attorney, Agent, or Firm*—Larry I. Golden; Kareem M. Irfan; Wayne Stoppelmoor

[57] ABSTRACT

A neutral lug assembly for coupling neutral wire conductors to a neutral plate in the panelboard is provided, the neutral lug assembly includes a generally u-shaped bracket adapted to be electrically coupled to the panelboard neutral plate and having first and second stair-step shaped side portions. A cross strap having a first end secured to the first side portion, a second end secured to the second side portion and a middle portion. A securing means is provided for securing the first and second end of the cross strap to the first and second side portions of the bracket, wherein the securing means electrically couples the cross strap to the first and second side portions. A connector is coupled to the middle portion of the cross strap for coupling at least one neutral wire conductor to the bracket.

5 Claims, 5 Drawing Sheets

NEUTRAL LUG ASSEMBLY FOR A PANELBOARD

FIELD OF THE INVENTION

This invention relates generally to electrical distribution panelboards and, more specifically, to means for increasing current capacity in panelboards by increasing the number of terminal connectors that can be coupled thereto thereby enhancing the current capacity of the panelboard.

BACKGROUND OF THE INVENTION

In the electrical power distribution field, electrical circuit breaker panelboards are generally designed to distribute a nominally rated current. However, in applications having non-linear loads, harmonic currents may increase the neutral conductor loading up to 187% of the nominal rating. An accepted method for handling the currents in this condition, is to double the number of neutral conductors. In order to accommodate this increase in the number of neutral conductors, there must be a corresponding increase in the number of terminal lug connectors available at the neutral conductor terminals. However, in most cases, additional space is not available in the panelboard to add more terminal connectors.

Most panelboards have their neutral lug terminal connectors positioned in a two dimensional rectangular flat plane fashion by only utilizing length and width, with depth used as a single plane. Hence, the total number of terminal connectors that can be accommodated with the panelboard is limited. One solution to this problem was to utilize a terminal block connector having wire conductor ports at different elevations. Another solution to the problem was to fasten connector terminal strips to a plate at different elevations. However, the solutions presented in the prior art had the limitations of not allowing the terminal connectors to be interchangeable and prohibited easy access to the wire conductor fasteners after the wire conductors were installed in the connectors. According to the present invention, available panelboard space is efficiently used in terms of its three dimensional parameters, length, width and depth while allowing the terminal connectors to be interchangeable. The present invention increases the number of terminal connectors that can be positioned within the panelboard by maximizing the utilization of the depth dimension within the panelboard. Furthermore, it is desirable to use standard neutral conductor lug bar connectors and provide a means of flexibly arranging the combinations of terminal connector sizes for different ampacity applications while allowing easy access to the wire Fasteners. The neutral lug assembly of the present invention is sized to conduct the potential current loads that occur with non-linear loads and has interchangeable connectors arranged in the form of stair steps to allow termination of conductors at various elevations without obscuring any previous connection.

SUMMARY OF THE INVENTION

It is a general object of the present invention to provide an assembly which obtains sufficient current capacity to meet the demands of the unanticipated harmonic currents while not requiring additional space in the panelboard.

It is a more specific object of the present invention to provide a neutral lug assembly that allows multiple terminal connectors to be mounted thereto while allowing the flexibility of being able to interchange the terminal connectors.

In accordance with a preferred embodiment of the present invention a neutral lug assembly is provided in a panelboard for coupling neutral wire conductors to a neutral plate in the panelboard, the neutral lug assembly includes a bracket and a plurality of cross straps coupled to the bracket. A wire connector is coupled to each one of the plurality of cross straps. The bracket is adapted to dispose the plurality of cross straps in different planes thereby accommodating more wire connectors in a given space in the panelboard and allowing the wire connectors to be interchangeable.

In accordance with another aspect of the preferred embodiment of the present invention a neutral lug assembly is provided in a panelboard for coupling neutral wire conductors to a neutral plate in the panelboard, the neutral lug assembly includes a bracket having a base portion and generally stair-step shaped side portions. A wire connector is coupled to cross strap which is secured to the bracket sides.

In accordance with yet another aspect of the preferred embodiment of the present invention a neutral lug assembly for coupling neutral wire conductors to a neutral plate in the panelboard is provided, the neutral lug assembly includes a generally u-shaped bracket adapted to be electrically coupled to the panelboard neutral plate and having first and second stair-step shaped side portions. A cross strap having a first end secured to the first side portion, a second end secured to the second side portion and a middle portion. A securing means is provided for securing the first and second end of the cross strap to the first and second side portions of the bracket, wherein the securing means electrically couples the cross strap to the first and second side portions. A connector is coupled to the middle portion of the cross strap for coupling at least one neutral wire conductor to the bracket.

BRIEF DESCRIPTION OF THE DRAWINGS

Other objects and advantages of the invention will be apparent from the following detailed description and the accompanying drawings in which.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

Figure 1:
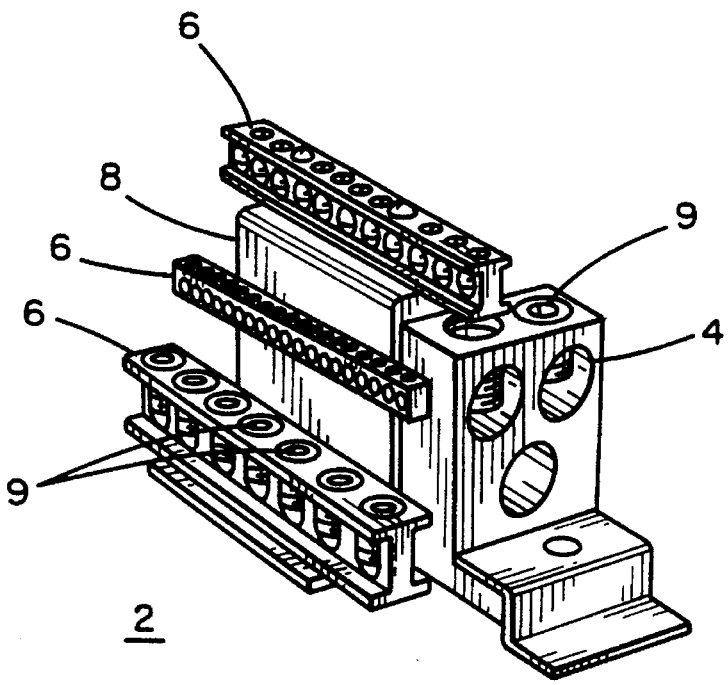
FIG. 1 shows a prior art neutral lug assembly.

A prior art neutral lug assembly 2 for connecting neutral wire conductors thereto in a panelboard is shown in FIG. 1 including a main neutral lug connector and branch neutral lug connector 6 secured to a conductive plate 8. Conductive wires are secured into the connectors with wire retaining fasteners 9. The branch neutral lug connectors 6 are located in dedicated positions on the conductive plate 8 creating the disadvantage of not being able to reposition the branch neutral lug connectors. Additionally, the branch neutral lug connectors are not capable of being replaced with different sized terminal lug connectors. Another disadvantage of the prior art neutral lug assembly is that once the wire conductors are secured into all of the terminal lug conductors the wire retaining fasteners 9 are not easily accessible thereby not allowing for the ability to check the tightness of the fasteners 9.

Therefore, it would be desirable to provide a neutral terminal assembly which allows the interchangeability of the terminal lug connectors and allows the ability to check the tightness of the wire retaining fasteners after the wire conductors are coupled to the terminal lug connectors.

The present invention solves the problems of the prior art by efficiently utilizing available panelboard space in terms of its three dimensional parameters, length, width and depth while allowing the terminal connectors to be interchangeable. The present invention increases the number of terminal connectors that can be positioned within the panelboard by maximizing the utilization of the depth dimension within the panelboard. Furthermore, it is desirable to use standard neutral conductor lug bar connectors and provide a means of flexibly arranging the combinations of terminal connector sizes for different ampacity applications. The neutral lug assembly of the present invention is sized to conduct the potential current loads that occur with non-linear loads and has interchangeable connectors arranged in the form of stair steps to allow termination of conductors at various elevations without obscuring any previous connection or wire retaining fastener.

Figure 2:
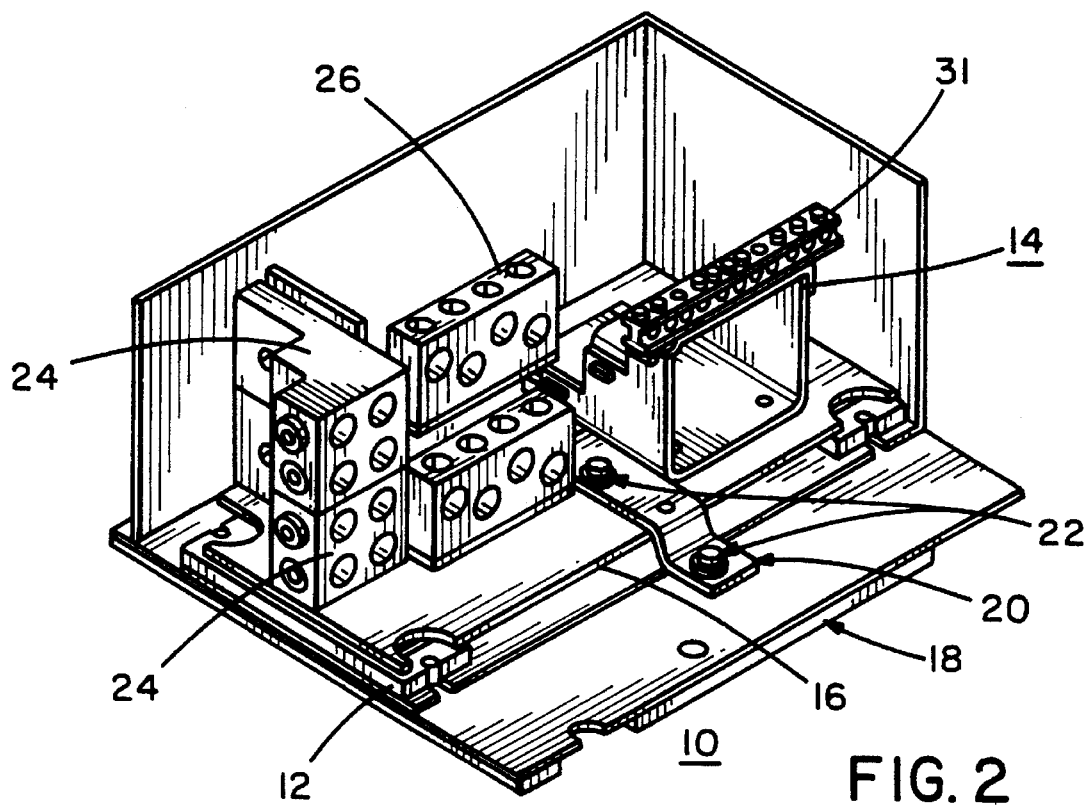
FIG. 2 is a partial perspective view of a panelboard which incorporates a neutral lug assembly, according to the present invention.
Figure 3:
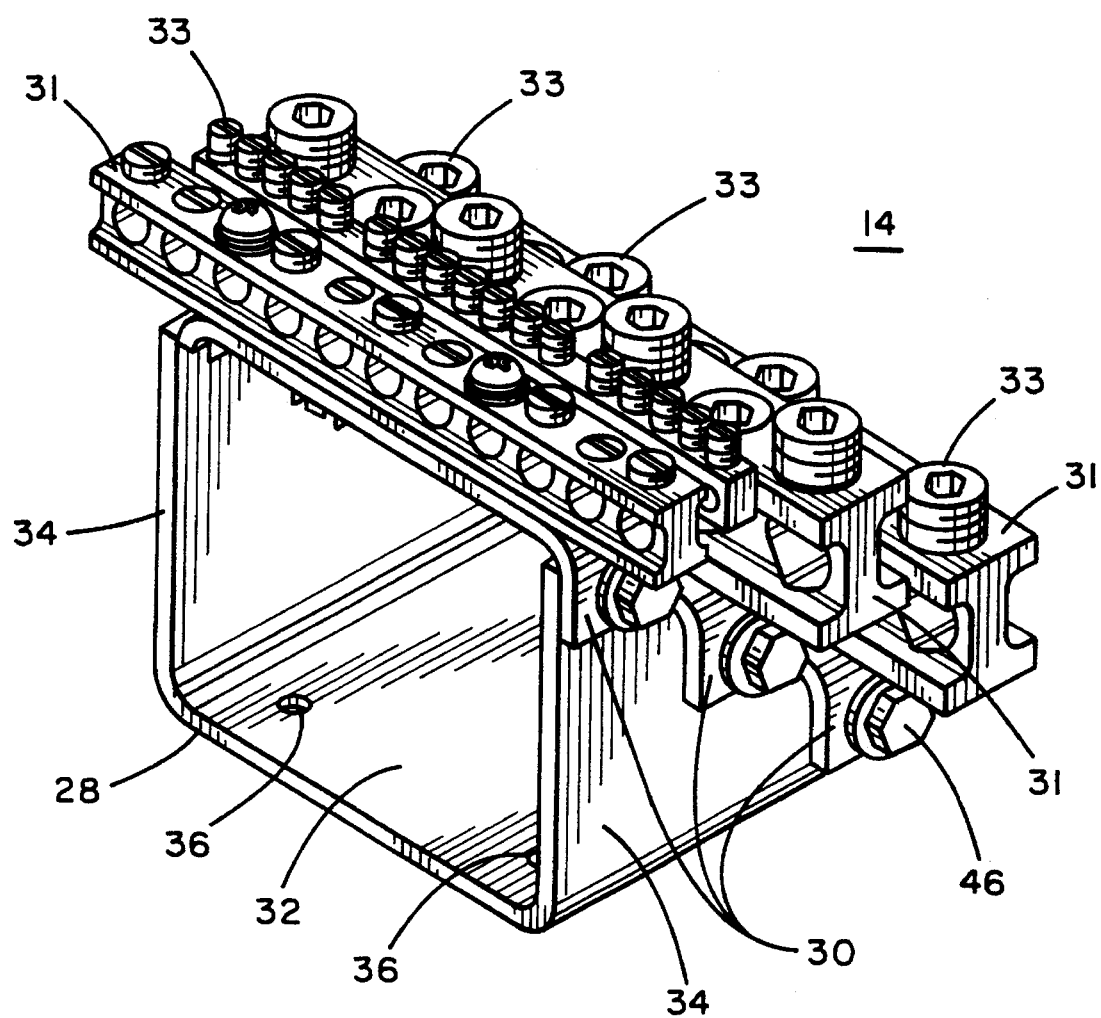
FIG. 3 is a representation perspective view of the neutral lug assembly shown in FIG. 2.
Figure 4:
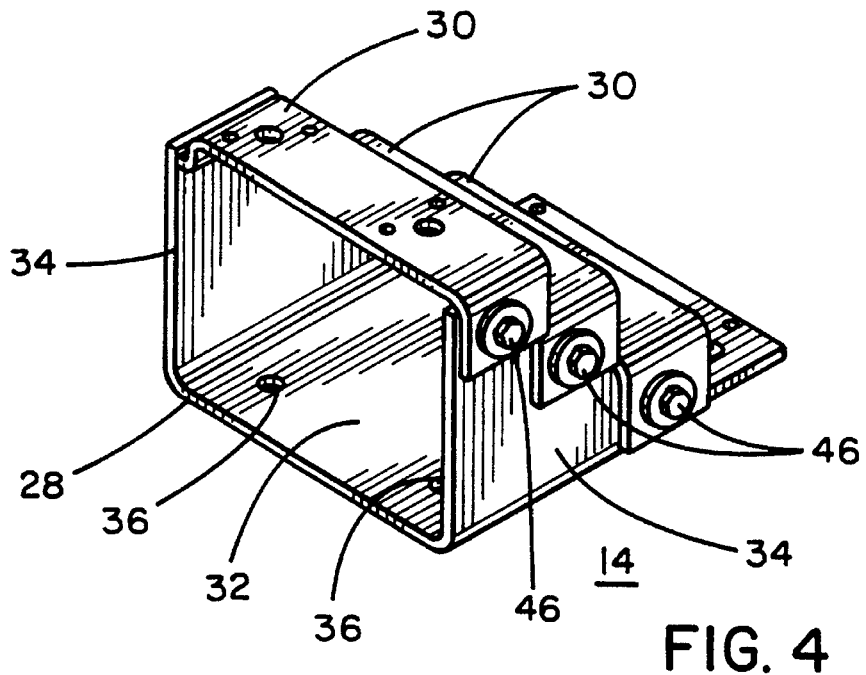
FIG. 4 is a plan perspective view of the bracket and cross strap which are utilized in the neutral lug assembly shown in FIG. 3.

Now referring to FIG. 2, a panelboard 10 is partially shown having a neutral base 12 secured therein and a neutral plate 16 coupled to the neutral base 12. A neutral lug assembly 14 having at least one traditional branch neutral terminal lug connector 31 is attached to the neutral plate 16 for coupling neutral signals to the neutral plate 16. If the neutral plate 16 and the mounting pan 18 are required to be coupled together, such as required in a service entrance application, one end of a bonding strap 20 is coupled to the neutral plate 16 and the other end is coupled to a mounting pan 18 utilizing a pair of screws 22. Traditional main neutral lug connectors 24 and branch neutral terminal lug connectors 26 are shown being coupled to the neutral plate 12.

Referring now to FIGS. 3–6, the neutral lug assembly 14 is shown including a bracket 28 and metal cross straps 30 secured thereto. Traditional branch neutral terminal connector lugs 31 are secured to the cross straps 30 with traditional means such as bolts or screws. The bracket 28 is generally u-shaped and is formed from one piece of conductive metal and includes a base portion 32 and two complementary shaped side portions 34. The base portion 32 has holes 36 therein for securing the bracket 28 to the neutral plate 16 by traditional means such as a bolt and nut assembly. The side portions 34 are stair-step shaped for accommodating staggered rows of cross straps 30 thereby having staggered rows of connectors 31 and allowing additional wire conductors (not shown) to be coupled to the neutral plate 12. One side of the bracket 28 includes slots 39 for securing one end of the cross straps 30 therein and the other side of the bracket 28 has holes 37 for securing the other end of the cross straps 30.

The one piece, metal cross straps 30 are generally u-shaped and have a tab 38 at one end, a hole 40 in the other end and a generally flat middle portion 42. The middle portion 42 has holes 44 therein for accepting a bolt or screw (not shown) therethrough for securing the wire connectors 31 to the middle portion 40. The cross straps 30 are secured to the bracket 28 by securing the tab 38 into the corresponding slots 39 in the bracket side portion and inserting a traditional screw 46 through the holes 40 and 37.

Wire conductors (not shown) are positioned into the neutral lug assembly 14 from the end with the largest opening between the base portion 32 and the cross strap 30 and fastened into the connectors 31 by securing a wire retaining fastener 33 tightly onto the wire conductor. The present invention provides the advantage of allowing accessibility to the wire fasteners 33 even when all of the wire conductors are fastened to the connectors 31. The advantage of connector lug interchangeability is provided by allowing the connector lugs 31 to be positioned on any of the cross straps 30 and by allowing different sized terminal connectors to be secured to the cross straps 30.

Figure 5:
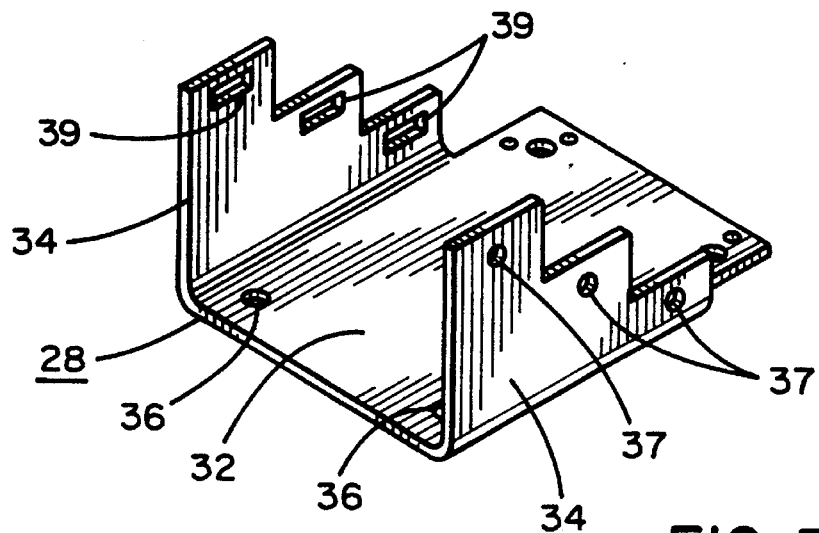
FIG. 5 is a plan perspective view of the bracket which is utilized in the neutral lug assembly shown in FIG. 3.
Figure 6:
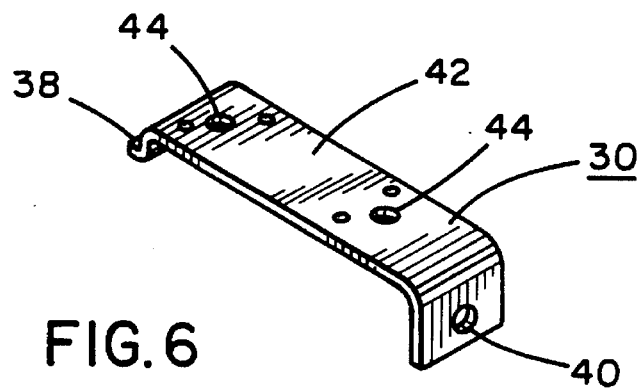
FIG. 6 is a plan perspective view of the cross strap which is utilized in the neutral lug assembly shown in FIG. 3.
Figure 7:
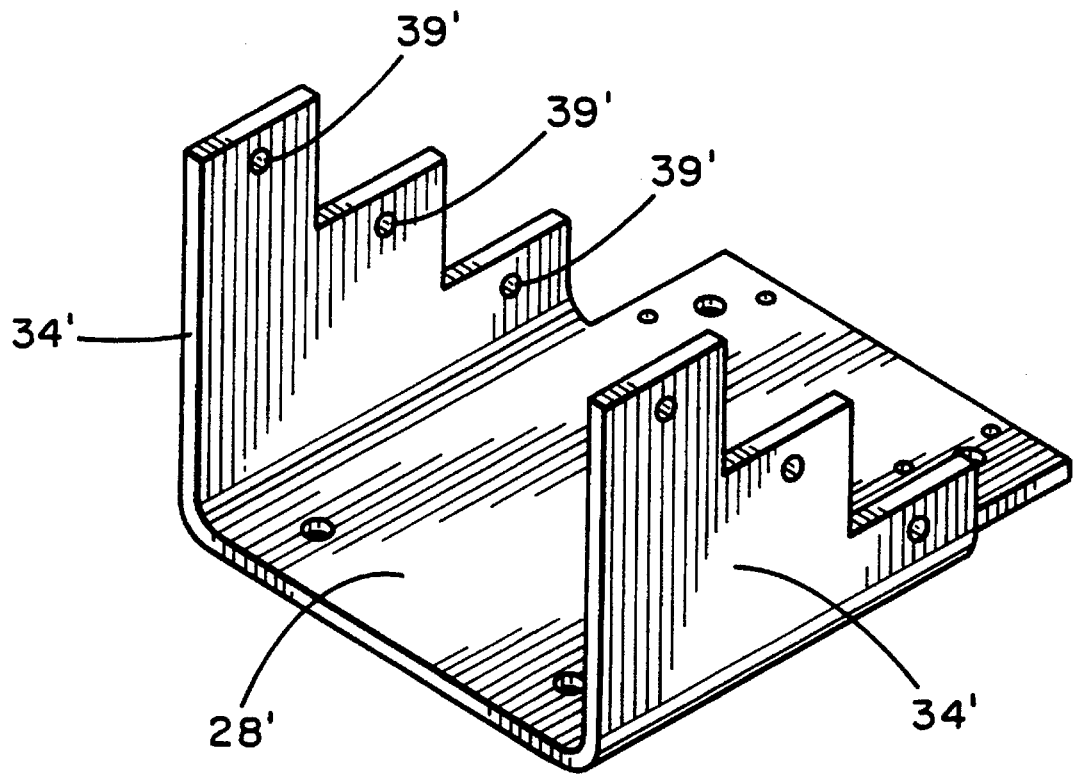
FIG. 7 is a plan perspective view of an alternate embodiment of the bracket shown in FIG. 5.
Figure 8:
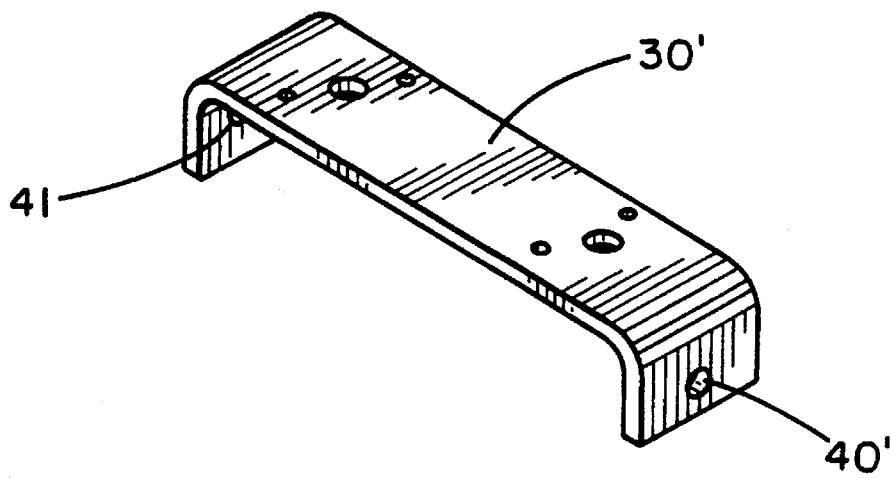
FIG. 8 is a plan perspective view of an alternate embodiment of the cross strap shown in FIG. 6.

Although the means for securing the cross strap 30 to the bracket 28 in the preferred embodiment is shown as a tab/slot arrangement at one end of the cross strap 30 and the other end being secured with a traditional bolt, an alternate embodiment, as shown in FIGS. 7 and 8, provides a bracket 28' which is identical to the bracket 28 shown in FIG. 5 except that the slots 39 are replaced with apertures 39'. A cross strap 30' is shown in FIG. 8 being identical to the cross strap 30 shown in FIG. 6 with the exception that the alternate cross strap 30' has apertures 40' and 41 in both ends and does not have a tab extending from one of its ends. The alternate cross strap 30' is secured to the alternate bracket 28' utilizing a bolt which is threaded into the upright legs of side portions 34' of the bracket 28' at both ends of the cross strap 30'.

Figure 9:
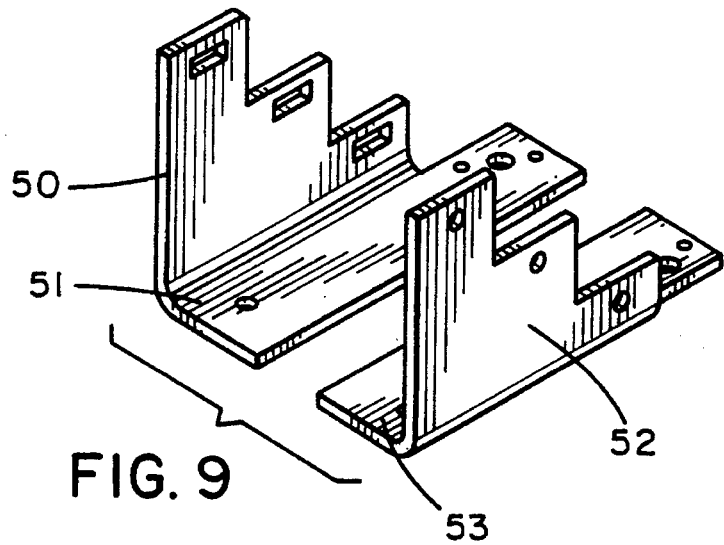
FIG. 9 is a plan perspective view of an alternate embodiment of the bracket which is utilized in the neutral lug assembly shown in FIG. 2.
Figure 10:
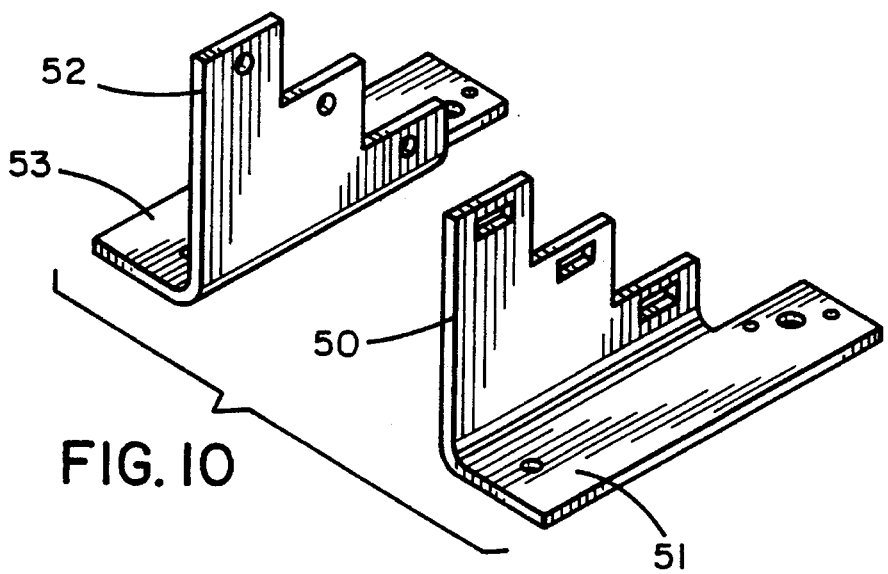
FIG. 10 is a plan perspective view of an alternate embodiment of the bracket which is utilized in the neutral lug assembly shown in FIG. 2.

FIGS. 9 and 10 show another embodiment of the bracket of the present invention. The u-shaped bracket 28 (FIG. 5) can be separated into two complementary L-shaped brackets 50 and 52 having base portions 51 and 53, respectively. The two L-shaped brackets are secured to the neutral plate and adapted to have the cross straps secured thereto as mentioned above. The base portions 51 and 53 may by positioned towards each other, as shown in FIG. 9, or away from each other, as shown in FIG. 10.

Figure 11:
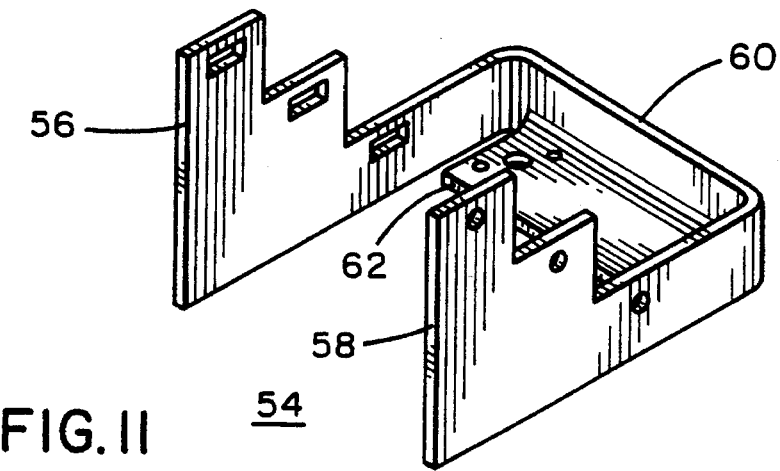
FIG. 11 is a plan perspective view of an alternate embodiment of the bracket which is utilized in the neutral lug assembly shown in FIG. 2.

FIG. 11, shows another embodiment of the present invention in which a one piece bracket 54 has two stair-step shaped side portions 56 and 58 which are connected therebetween by a front portion 60. A base portion 62 is utilized to secure the bracket 54 to the neutral plate. Cross straps are secured to the side portions in a similar manor as mentioned above.

The stair-step shaped bracket of the present invention allows more neutral connectors to be located in a the same amount of space as previously provided by traditional neutral assemblies while allowing the flexibility of having interchangeable terminal connectors and allowing easy access to the wire retaining fasteners. Therefore more neutral conductors may be connected to the panelboard, thereby increasing the current that may flow through the device.

While there have been shown and described what are at present considered the preferred embodiments of the invention, it will be obvious to those skilled in the art that various changes and modifications may be made therein without departing from the scope of the invention as defined by the appended claims.

What is claimed is:

1. A neutral lug assembly for coupling neutral wire conductors to a neutral plate in a panelboard, said neutral lug assembly comprising:

a generally u-shaped bracket having generally stair-step shaped first and second side portions, including at least one slot in said first side portion and an aperture in said second side portion;

a plurality of generally u-shaped cross straps coupled to said bracket, each of said cross straps including a first end portion having a tab extending therefrom and including a second end portion having an aperture therein, said tab extending into said slot in said first side portion of said bracket, each of said cross straps further including a pin member extending through said apertures in said second end portion of said cross strap and said second side portion of said bracket; and a wire connector coupled to each one of said plurality of cross straps;

said bracket being adapted to dispose said plurality of cross straps in different planes thereby accommodating more of said wire connectors in a given space in the panelboard and allowing said wire connectors to be interchangeable.

2. A neutral lug assembly for coupling neutral wire conductors to a neutral plate in a panelboard, said neutral lug assembly comprising:

a generally u-shaped bracket having a base portion and generally stair-step shaped first and second side portions, said bracket further including at least one slot in said first side portion and an aperture in said second side portion;

at least one generally u-shaped cross strap, coupled to said first and second side portions, including a first end portion having a tab extending therefrom and including a second end portion having an aperture therein, said tab extending into said slot in said first side portion of said bracket, said cross strap further including a pin member extending through said apertures in said second end portion of said cross strap and said second side portion of said bracket; and a wire connector coupled to at least one of said cross straps.

3. For an electrical panelboard, a neutral lug assembly for coupling neutral wire conductors to a neutral plate in the panelboard, said neutral lug assembly comprising:

a bracket assembly adapted to be electrically coupled to the neutral plate, said bracket assembly having first and second stair-step shaped side portions;

a cross strap having a first end secured to said first side portion, a second end secured to said second side portion and a middle portion;

securing means for securing said first and second ends of said cross strap to said first and second side portions of said bracket, wherein said securing means electrically couples said cross strap to said first and second side portions, said securing means comprising a tab extending from said first end of said cross strap into a slot in said first side portion and a pin member secured within an aperture in said second end and an aperture in said second side portion; and a connector coupled to said middle portion of said cross strap for coupling at least one neutral wire conductor to said bracket.

4. A neutral lug assembly as claimed in claim 3, wherein said securing means comprises a pin member secured within a pair of holes in said first end and said first side portion and a pin member secured within a pair of holes in said second end and said second side portion.

5. A neutral lug assembly as claimed in claim 3, wherein said bracket is generally u-shaped.

* * * * *